(12) United States Patent
Kimoto et al.

(10) Patent No.: US 11,506,321 B2
(45) Date of Patent: Nov. 22, 2022

(54) PIPE HEATING DEVICE AND SUBSTRATE PROCESSING APPARATUS

(71) Applicant: TOKYO ELECTRON LIMITED, Tokyo (JP)

(72) Inventors: Tomohisa Kimoto, Nirasaki (JP); Eiichi Komori, Nirasaki (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 233 days.

(21) Appl. No.: 16/701,870

(22) Filed: Dec. 3, 2019

(65) Prior Publication Data

US 2020/0182390 A1 Jun. 11, 2020

(30) Foreign Application Priority Data

Dec. 6, 2018 (JP) .............................. JP2018-229302

(51) Int. Cl.
*F16L 53/38* (2018.01)
*H01H 37/12* (2006.01)
*H05B 3/12* (2006.01)

(52) U.S. Cl.
CPC .............. *F16L 53/38* (2018.01); *H01H 37/12* (2013.01); *H05B 3/12* (2013.01)

(58) Field of Classification Search
CPC ....... F16L 53/38; G01K 13/02; G01K 13/024; H01H 37/043; H01H 37/12; H05B 2203/022; H05B 3/12; H05B 3/54
USPC ............... 392/465, 472, 480, 481, 488, 489; 219/212, 528, 535, 544, 542, 548, 549, 219/553, 505; 338/208, 210, 214; 29/747, 508

See application file for complete search history.

(56) References Cited

U.S. PATENT DOCUMENTS

| | | | |
|---|---|---|---|
| 3,949,189 A * | 4/1976 | Bilbro | B23P 15/26 392/468 |
| 5,862,303 A * | 1/1999 | Adar | H05B 3/58 392/472 |
| 6,627,859 B1 * | 9/2003 | Kasai | H05B 1/0247 219/505 |
| 2007/0017502 A1* | 1/2007 | Kamikawa | F24H 1/162 126/374.1 |
| 2011/0021039 A1* | 1/2011 | Murata | H01L 21/67109 438/795 |
| 2017/0009926 A1* | 1/2017 | Marucci | H05B 1/02 |

FOREIGN PATENT DOCUMENTS

| | | | |
|---|---|---|---|
| JP | 2000-248363 A | | 9/2000 |
| JP | 2000-252223 A | | 9/2000 |
| JP | 2002-359238 A | | 12/2002 |
| JP | 2003-77897 A | | 3/2003 |

(Continued)

*Primary Examiner* — Ibrahime A Abraham
*Assistant Examiner* — Ket D Dang
(74) *Attorney, Agent, or Firm* — Nath, Goldberg & Meyer; Jerald L. Meyer; Tanya E. Harkins

(57) ABSTRACT

There is provided a pipe heating device, including; a sensor installed in a gas pipe; a heating part having a heat generation portion arranged so as to cover the gas pipe except for a region of the gas pipe where the sensor is installed; and a heat conducting member attached between an outer peripheral surface of the gas pipe and the sensor and formed of a material having a higher thermal conductivity than the gas pipe.

12 Claims, 4 Drawing Sheets

(56) References Cited

FOREIGN PATENT DOCUMENTS

| | | | |
|---|---|---|---|
| JP | 2015-185824 | A | 10/2015 |
| JP | 2017-076781 | A | 4/2017 |
| KR | 10-2010-0070561 | A | 6/2010 |

\* cited by examiner

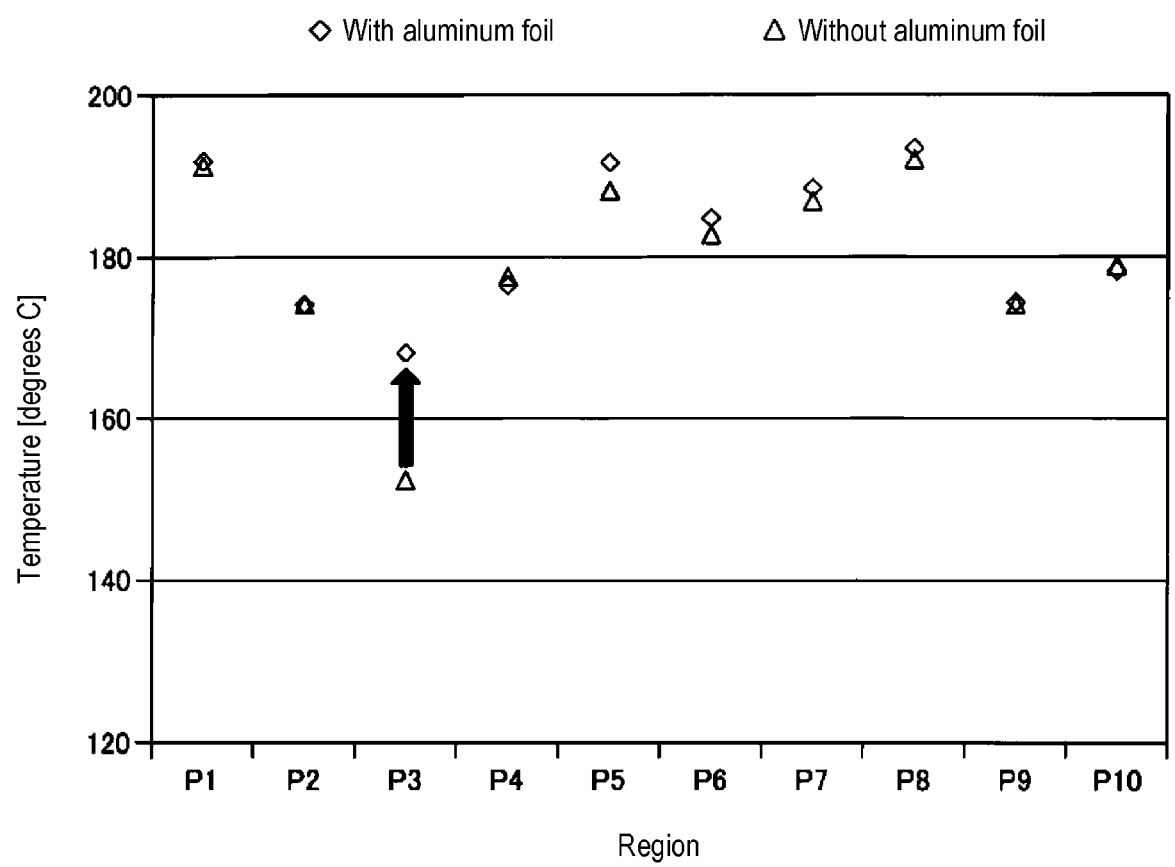

PIPE HEATING DEVICE AND SUBSTRATE PROCESSING APPARATUS

CROSS-REFERENCE TO RELATED APPLICATION

This application is based upon and claims the benefit of priority from Japanese Patent Application No. 2018-229302, filed on Dec. 6, 2018, the entire contents of which are incorporated herein by reference.

TECHNICAL FIELD

The present disclosure relates to a pipe heating device and a substrate processing apparatus.

BACKGROUND

A technique is known in which a ribbon heater is attached to an exposed portion of a pipe of a gas supply system in a solid raw material vaporizer to heat the pipe to such a predetermined temperature that does not cause condensation of a vaporized gas.

PRIOR ART DOCUMENT

Patent Documents

Patent Document 1: Japanese Laid-Open Patent Publication No. 2002-359238

SUMMARY

According to one embodiment of the present disclosure, there is provided a pipe heating device, including; a sensor installed in a gas pipe; a heating part having a heat generation portion arranged so as to cover the gas pipe except for a region of the gas pipe where the sensor is installed; and a heat conducting member attached between an outer peripheral surface of the gas pipe and the sensor and formed of a material having a higher thermal conductivity than the gas pipe.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 5 is a view for explaining the effects provided by the pipe heating device according to one embodiment.

DETAILED DESCRIPTION

Figure 1:
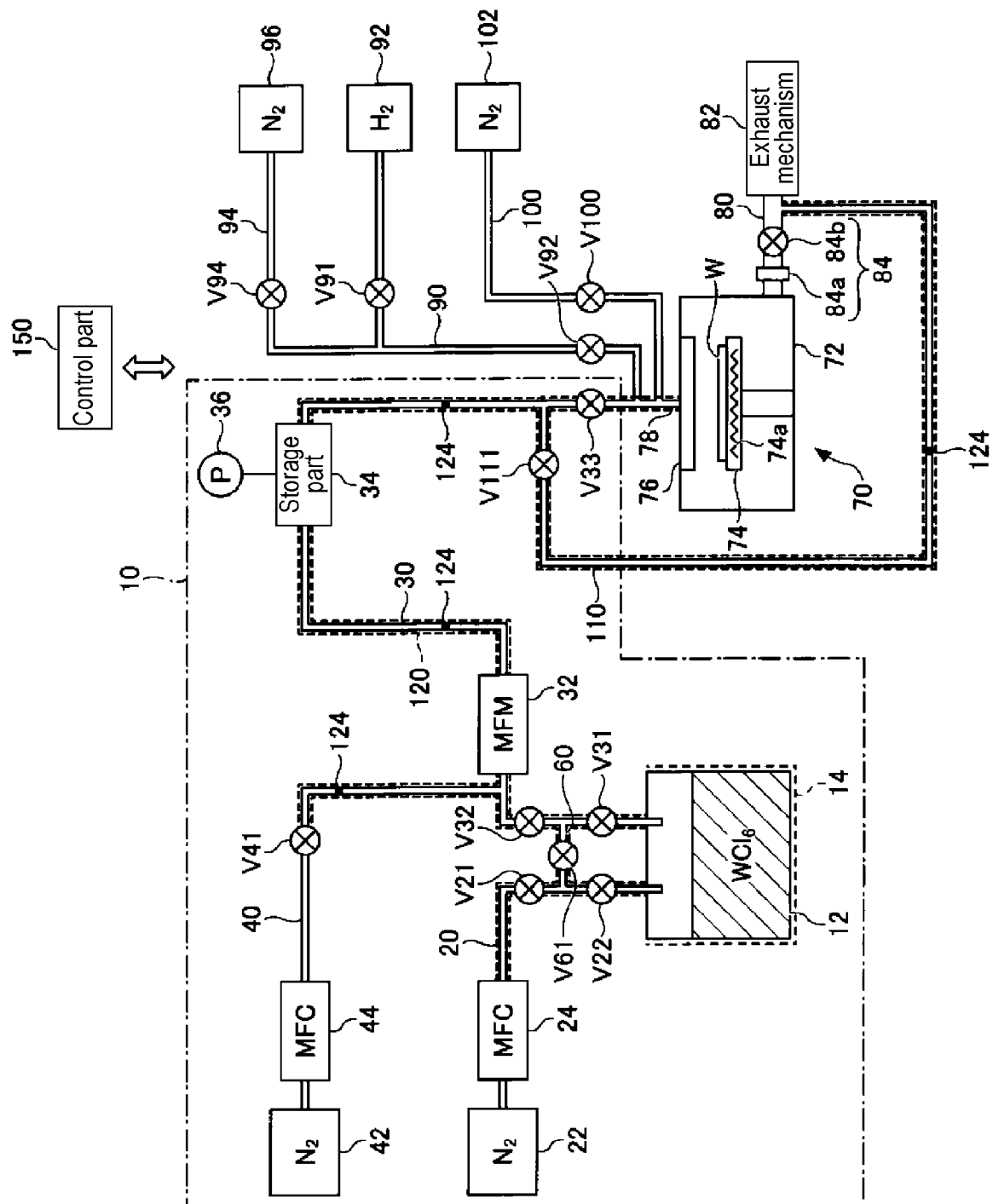
FIG. 1 is a schematic diagram showing a configuration example of a substrate processing apparatus according to one embodiment.

Hereinafter, non-limitative exemplary embodiments of the present disclosure will now be described with reference to the accompanying drawings. In all the accompanying drawings, the same or corresponding members or components will be denoted by the same or corresponding reference numerals, and redundant explanations thereof will be omitted. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

[Substrate Processing Apparatus]

An exemplary configuration in which a pipe heating device of one embodiment is applied to a substrate processing apparatus will be described. FIG. 1 is a schematic diagram showing a configuration example of the substrate processing apparatus according to one embodiment.

As shown in FIG. 1, the substrate processing apparatus includes a raw material gas supply device 10, a film formation processing part 70, a pipe heating device 120 and a control part 150. The raw material gas supply device 10 supplies a raw material gas to the film formation processing part 70. The film formation processing part 70 forms a film on a wafer W, which is a substrate, by an atomic layer deposition (ALD) method, a chemical vapor deposition (CVD) method, or the like. The pipe heating device 120 heats various gas pipes provided in the substrate processing apparatus. The control part 150 controls operations of respective components of the raw material gas supply device 10, the film formation processing part 70 and the pipe heating device 120. In the specification, a gas including a carrier gas and a (vaporized) raw material flowing together with the carrier gas will be referred to as a raw material gas.

The raw material gas supply device 10 includes a raw material container 12 that stores a raw material remaining in a solid or liquid state at room temperature. A heater 14 is provided around the raw material container 12. The heater 14 vaporizes the raw material by heating the solid or liquid raw material stored in the raw material container 12 to an appropriate temperature. In one embodiment, the raw material may be a solid raw material and may be tungsten hexachloride ($WCl_6$). The raw material is not limited to $WCl_6$, and may be a low vapor pressure raw material. For example, the raw material may be tungsten pentachloride ($WCl_5$), molybdenum pentachloride ($MoCl_5$), zirconium tetrachloride ($ZrCl_4$), tantalum pentachloride ($TaCl_5$) or dodecacarbonyl triruthenium ($Ru_3(CO)_{12}$).

A downstream end of a carrier gas supply pipe 20 and an upstream end of a raw material gas supply pipe 30 are inserted into the raw material container 12. A carrier gas source 22, which is a source of a carrier gas, is provided at an upstream end of the carrier gas supply pipe 20. The carrier gas may be an inert gas such as a nitrogen ($N_2$) gas or the like. In the carrier gas supply pipe 20, a mass flow controller (MFC) 24, a valve V21 and a valve V22 are provided in the named order from the upstream side. The MFC 24 controls a flow rate of the carrier gas that flows through the carrier gas supply pipe 20.

On the other hand, in the raw material gas supply pipe 30, a valve V31, a valve V32, a mass flow meter (MFM) 32, a storage part 34 and a valve V33 are provided in the named order from the upstream side. The MFM 32 measures a flow rate of the raw material gas flowing through the raw material gas supply pipe 30. The storage part 34 temporarily stores a raw material gas and supplies a necessary raw material gas in a short period of time. The valve V33 is a valve for switching supply and cutoff of a gas during ALD, and may be, for example, an ALD valve that can be opened and closed at a high speed. The ALD valve may be opened and closed at intervals of 0.5 seconds or less, more specifically at intervals of 0.01 seconds or less. The storage part 34 is provided with a pressure gauge 36 for measuring a pressure of the gas stored in the storage part 34. The pressure gauge 36 may be, for example, a capacitance manometer. The vicinity of a downstream end of the raw material gas supply pipe 30 is shown as a gas supply flow path 78 because a reaction gas or a purge gas described later also flows in the vicinity of the downstream end of the raw material gas supply pipe 30.

A downstream end of a dilution gas supply pipe 40 for supplying a dilution gas is joined with the raw material gas supply pipe 30 at a position between the valve V32 and the MFM 32. A dilution gas source 42 as a source of the dilution gas is provided at an upstream end of the dilution gas supply pipe 40. The dilution gas may be an inert gas such as an $N_2$ gas or the like. The dilution gas is also referred to as offset gas. In the dilution gas supply pipe 40, a mass flow controller (MFC) 44 and a valve V41 are provided in the named order from the upstream side.

A bypass pipe 60 is provided so as to connect a position between the valve V21 and the valve V22 in the carrier gas supply pipe 20 and a position between the valve V31 and the valve V32 in the raw material gas supply pipe 30. The bypass pipe 60 is a flow path through which the carrier gas, which is supplied from the carrier gas source 22 to the carrier gas supply pipe 20, is supplied to the raw material gas supply pipe 30 without going through the raw material container 12. A valve V61 is provided in the bypass pipe 60. By closing the valves V22 and V31 and opening the valves V21, V61 and V32, the carrier gas supplied from the carrier gas source 22 is supplied to the raw material gas supply pipe 30 through the carrier gas supply pipe 20 and the bypass pipe 60. Thus, the raw material gas supply pipe 30 can be purged. Furthermore, the MFM 32 can be calibrated to minimize the deviation of a flow rate measurement value from the MFC 24. Moreover, by measuring a difference between the case where the carrier gas goes through the raw material container 12 and the case where the carrier gas does not go through the raw material container 12, the supply amount of the raw material gas can be accurately measured.

The film formation processing part 70 includes a processing container 72, a stage 74 and a gas introduction part 76. The processing container 72 is a vacuum container whose interior can be depressurized. The stage 74 is provided inside the processing container 72 to hold the wafer W in a horizontal posture. The stage 74 includes a heater 74a. The wafer W is heated to a predetermined temperature by the heater 74a. The gas introduction part 76 introduces a raw material gas or the like into the processing container 72. A gas supply flow path 78 is connected to the gas introduction part 76. The gas supplied from the raw material gas supply device 10 is supplied into the processing container 72 through the gas introduction part 76. Furthermore, an exhaust mechanism 82 is connected to the processing container 72 via an exhaust pipe 80. A pressure adjustment part 84 for adjusting an internal pressure of the processing container 72 is provided in the exhaust pipe 80. The pressure adjustment part 84 includes, for example, a pressure adjustment valve 84a and a valve 84b.

Furthermore, a reducing gas supply flow path 90 and a purge gas supply flow path 100 are joined with the gas supply flow path 78.

The reducing gas supply flow path 90 supplies a reducing gas for reducing the raw material gas into the processing container 72 therethrough. The reducing gas may be, for example, a hydrogen ($H_2$) gas. A reducing gas source 92, which is a source of the reducing gas, is provided at an upstream end of the reducing gas supply flow path 90. Furthermore, an inert gas supply flow path 94 is joined with the reducing gas supply flow path 90. An inert gas source 96, which is a source for supplying the inert gas, is provided at an upstream end of the inert gas supply flow path 94. The inert gas may be, for example, an $N_2$ gas. In the reducing gas supply flow path 90, a valve V91 and a valve V92 are provided in the named order from the upstream side. A valve V94 is provided in the inert gas supply flow path 94.

The purge gas supply flow path 100 supplies a purge gas therethrough. The purge gas may be, for example, an inert gas such as an $N_2$ gas or the like. A purge gas source 102, which is a source of the purge gas, is provided at an upstream end of the purge gas supply flow path 100. A valve V100 is provided in the purge gas supply flow path 100.

In addition, an evacuation pipe 110 is connected to the raw material gas supply pipe 30 at the downstream side of the storage part 34. The evacuation pipe 110 forms a flow path having one end connected to the raw material gas supply pipe 30 and the other end connected to the evacuation pipe 110. In other words, the evacuation pipe 110 forms a flow path that connects the raw material gas supply pipe 30 and the exhaust pipe 80 without going through the processing container 72. A valve V111 is provided in the evacuation pipe 110. By opening the valve V111 and closing the valve V33, the raw material gas flowing through the raw material gas supply pipe 30 flows toward the exhaust pipe 80 via the evacuation pipe 110 without going through the processing container 72 and is exhausted by the exhaust mechanism 82.

The pipe heating device 120 heats various gas pipes provided in the substrate processing apparatus. Examples of the gas pipes may include the carrier gas supply pipe 20 at the downstream side of the MFC 24, the raw material gas supply pipe 30, the dilution gas supply pipe 40 at the downstream side of the valve V41, the bypass pipe 60 and the evacuation pipe 110.

The control part 150 controls the operations of the respective parts of the raw material gas supply device 10, for example, the opening/closing operations of the valves V21, V22, V31, V32, V33, V41, V61 and V111, and the operations of the MFC 24 and MFC 44. The control part 150 also controls the operations of the respective parts of the film formation processing part 70, for example, the opening/closing operations of the valves V91, V92, V94 and V100, and the operation of the pressure adjustment part 84. Furthermore, the control part 150 controls the operations of the respective parts of the pipe heating device 120, for example, the operation of a heater power source 122 to be described later.

The control part 150 may be, for example, a computer. A computer program for operating the respective parts of the substrate processing apparatus is stored in a storage medium. The storage medium may be, for example, a flexible disk, a compact disk, a hard disk, a flash memory, a DVD, or the like.

[Pipe Heating Device]

Next, the pipe heating device 120 will be described by taking, as an example, a portion for heating the raw material gas supply pipe 30. However, portions for heating other gas pipes, for example, the carrier gas supply pipe 20, the dilution gas supply pipe 40, the bypass pipe 60 and the evacuation pipe 110 may be the same as the portion for heating the raw material gas supply pipe 30 described below.

Figure 2:
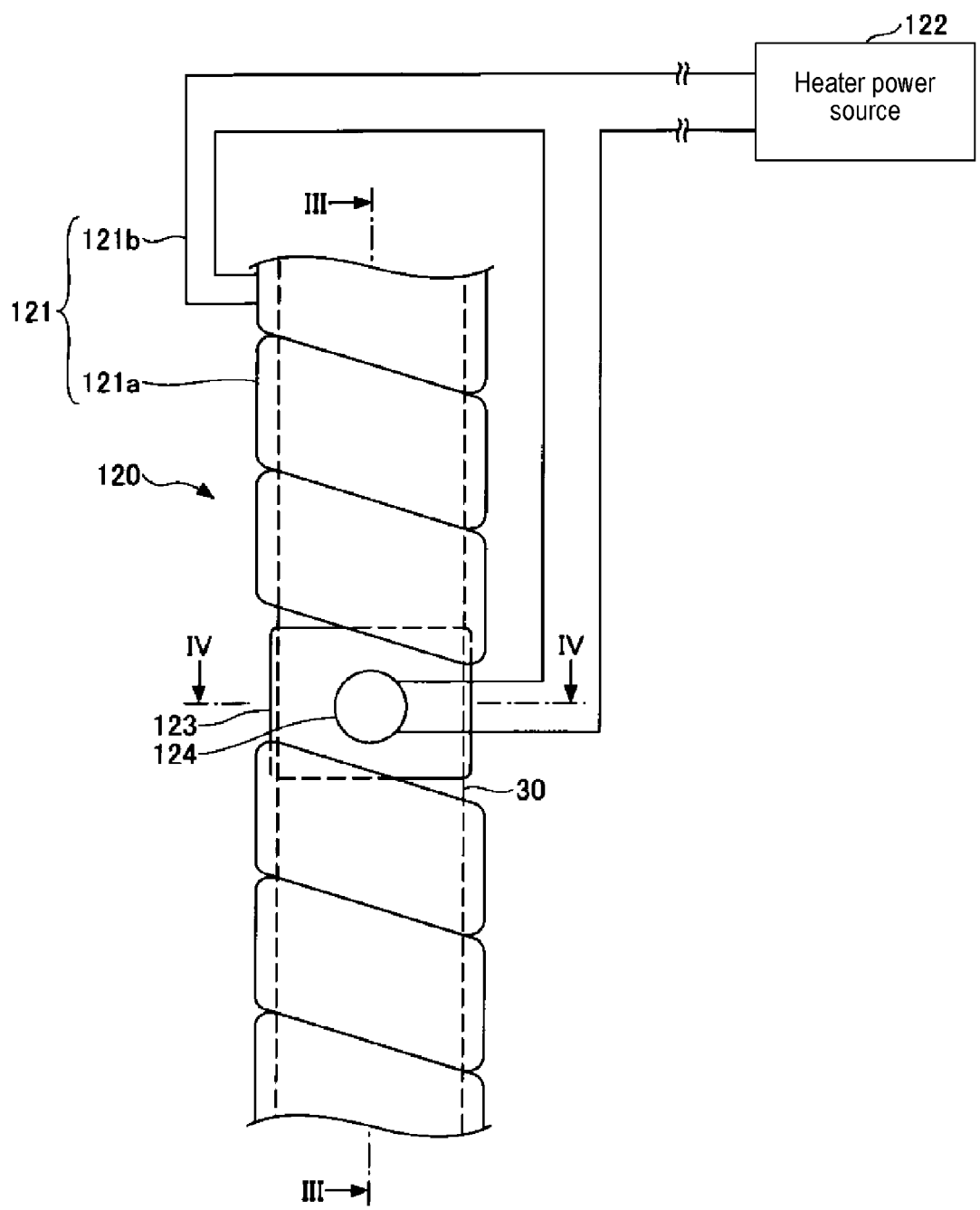
FIG. 2 is a side view showing a schematic configuration of an example of a pipe heating device according to one embodiment.
Figure 3:
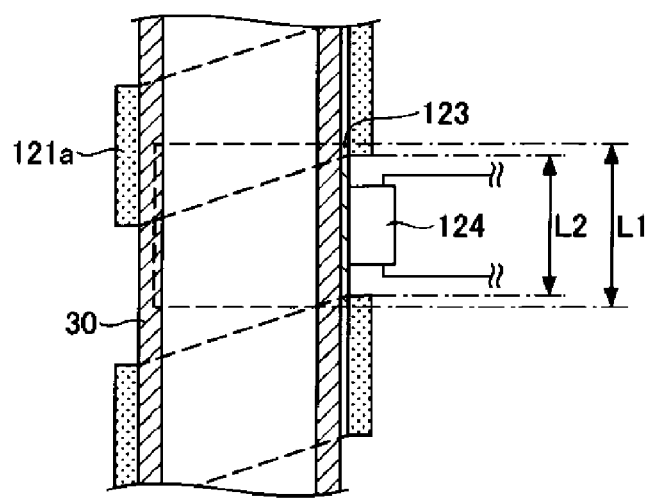
FIG. 3 is a vertical sectional view of the pipe heating device shown in FIG. 2.
Figure 4:
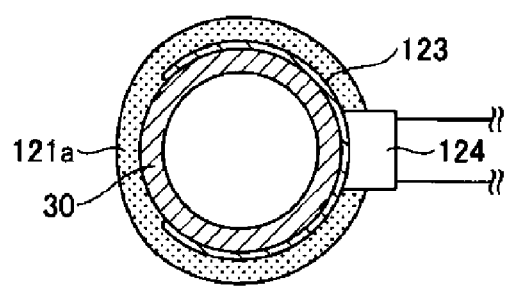
FIG. 4 is a horizontal sectional view of the pipe heating device shown in FIG. 2.

FIG. 2 is a side view showing a schematic configuration of an example of the pipe heating device 120 according to one embodiment. FIG. 3 is a vertical sectional view of the pipe heating device 120 shown in FIG. 2, showing a cross section taken along line in FIG. 2. FIG. 4 is a horizontal sectional view of the pipe heating device 120 shown in FIG. 2, showing a cross section taken along line IV-IV in FIG. 2.

The pipe heating device 120 includes a ribbon heater 121, a heater power source 122, a heat conducting member 123 and a thermal switch 124.

The ribbon heater 121 is an example of a heating part, and includes a heat generation portion 121a and a lead wire 121b. The heat generation portion 121a is wound spirally so as to cover the raw material gas supply pipe 30 except for a region of the raw material gas supply pipe 30 where the thermal switch 124 is arranged. The heat generation portion 121a includes a resistance heating element such as a nichrome wire or the like that generates heat based on a current supplied from the heater power source 122, and a covering material such as a glass cloth or the like that covers the resistance heating element. One end of the lead wire 121b is connected to the resistance heating element of the heat generation portion 121a, and the other end thereof is connected to the heater power source 122. By using the ribbon heater 121 as the heating part, the raw material gas supply pipe 30 can be heated at a low cost. The ribbon heater 121 is also referred to as a tape heater.

The heater power source 122 supplies the current to the resistance heating element of the heat generation portion 121a through the lead wire 121b. The current supplied from the heater power source 122 is controlled by the control part 150.

The heat conducting member 123 is attached between an outer peripheral surface of the raw material gas supply pipe 30 and the thermal switch 124. The heat conducting member 123 is made of a material having a higher thermal conductivity than the raw material gas supply pipe 30. Aluminum (Al), copper (Cu) or the like may be used as the material of the heat conducting member 123, for example, when the material of the raw material gas supply pipe 30 is stainless steel (SUS). The heat conducting member 123 may be a clamp member that clamps the raw material gas supply pipe 30. Thus, the heat conducting member 123 can be attached to the raw material gas supply pipe 30 without using a tool. A length L1 of the heat conducting member 123 in an axial direction of the raw material gas supply pipe 30 may be longer than a distance L2 between the heat generation portions 121a adjacent to each other as shown in FIG. 3. The heat from the adjacent heat generation portions 121a is transmitted to the region of the raw material gas supply pipe 30 where the heat generation portion 121a is not wound via the heat conducting member 123, and thus, the thermal uniformity of the raw material gas supply pipe 30 is improved. Therefore, it is possible to suppress re-solidification of the raw material gas when the raw material gas flows through the raw material gas supply pipe 30. As a result, it is possible to prevent generation of particles due to the re-solidification of the raw material gas.

The thermal switch 124 is installed via the heat conducting member 123 in the region of the outer peripheral surface of the raw material gas supply pipe 30 where the heat generation portion 121a is not wound. Thus, the thermal switch 124 can sense the temperature of the raw material gas supply pipe 30 instead of the temperature of the heat generation portion 121a. The thermal switch 124 is connected in series to the ribbon heater 121 to cut off the supply of electric power from the heater power source 122 to the ribbon heater 121 when the temperature of the raw material gas supply pipe 30 exceeds a predetermined temperature. The thermal switch 124 is an example of a sensor. Another sensor, for example, a temperature sensor that measures the temperature of the raw material gas supply pipe 30, may be installed instead of the thermal switch 124.

From the viewpoint of improving the thermal uniformity of the raw material gas supply pipe 30, it is also conceivable to arrange the ribbon heater 121 in all regions including the region of the raw material gas supply tube 30 where the thermal switch 124 is installed. However, in this case, the thermal switch 124 senses the temperature of the heat generation portion 121a of the ribbon heater 121 instead of the temperature of the raw material gas supply pipe 30. Therefore, even when the raw material gas supply pipe 30 does not reach the predetermined temperature or higher, if the heat generation portion 121a reaches the predetermined temperature or higher, erroneous detection occurs in which the thermal switch 124 is turned off to interrupt the supply of the current from the heater power source 122 to the ribbon heater 121.

Furthermore, in a case where the ribbon heater 121 is not arranged in the region of the raw material gas supply pipe 30 where the thermal switch 124 is not installed, it is possible to prevent the above-described erroneous detection. However, since the ribbon heater 121 is not arranged in the region of the raw material gas supply pipe 30 where the thermal switch 124 is not installed, the temperature of the region becomes lower than the ambient temperature, and the thermal uniformity of the raw material gas supply pipe 30 deteriorates.

On the other hand, according to the pipe heating device 120 of one embodiment, the heat generation portion 121a of the ribbon heater 121 is arranged to cover the raw material gas supply pipe 30 except for the region of the raw material gas supply pipe 30 where the thermal switch 124 is installed. Furthermore, the heat conducting member 123 formed of a material having a higher thermal conductivity than the raw material gas supply pipe 30 is attached between the outer peripheral surface of the raw material gas supply pipe 30 and the thermal switch 124. Thus, the heat from the periphery of the region is transmitted through the heat conducting member 123 toward the region of the raw material gas supply pipe 30 where the thermal switch 124 is installed, so that the thermal uniformity of the raw material gas supply pipe 30 is improved. Therefore, it is possible to suppress the re-solidification of the raw material gas when the raw material gas flows through the raw material gas supply pipe 30. As a result, it is possible to prevent generation of particles due to the re-solidification of the raw material gas.

In the above embodiment, there has been described the case where the heat conducting member 123 is attached to the region of the raw material gas supply pipe 30 where the thermal switch 124 is installed. However, the heat conducting member 123 may be attached to, for example, a joint of two ribbon heaters 121, an end portion of the ribbon heater 121, or the like. Thus, it is possible to suppress the falling of the gas pipe temperature in the joint of the two ribbon heaters 121, the end portion of the ribbon heater 121, or the like. Thus, the thermal uniformity of the gas pipe is further improved.

[Evaluation Results]

Next, the evaluation performed to confirm the effects of the pipe heating device 120 of one embodiment will be described.

First, as shown in FIGS. 2 to 4, the thermal switch 124 was disposed on the outer peripheral surface of the raw material gas supply pipe 30 through an aluminum foil, which is an example of the heat conducting member 123, and the ribbon heater 121 was attached so as to avoid the thermal switch 124. Subsequently, the raw material gas supply pipe 30 was heated to 180 degrees C. The temperatures of 10 locations including a region P3 of the raw material gas supply pipe 30 where the thermal switch 124 is disposed and regions P1 to P2 and P4 to P10 of the raw material gas supply pipe 30 where the thermal switch 124 is not disposed were measured.

For comparison, the thermal switch 124 was disposed on the outer peripheral surface of the raw material gas supply pipe 30 without arranging an aluminum foil which is an example of the heat conducting member 123, and the ribbon heater 121 was attached so as to avoid the thermal switch 124. Subsequently, the raw material gas supply pipe 30 was heated to 180 degrees C. The temperatures of 10 locations including the region P3 of the raw material gas supply pipe 30 where the thermal switch 124 is disposed and the regions P1 to P2 and P4 to P10 of the raw material gas supply pipe 30 where the thermal switch 124 is not disposed were measured.

FIG. 5 is a view for explaining the effects provided by the pipe heating device according to one embodiment, which shows the temperatures [degrees C.] in the regions P1 to P10 when the aluminum foil is provided (indicated by diamonds in FIG. 5) and when the aluminum foil is not provided (indicated by triangles in FIG. 5).

As shown in FIG. 5, when the aluminum foil is provided, the temperature in the region P3 where the thermal switch 124 is disposed was 168.1 degrees C., and the temperatures in the regions P1 to P2 and P4 to P10 where the thermal switch 124 is not disposed were 174.1 to 191.8 degrees C. On the other hand, when the aluminum foil is not provided, the temperature in the region P3 where the thermal switch 124 is disposed was 152.4 degrees C., and the temperatures in the regions P1 to P2 and P4 to P10 where the thermal switch 124 is not disposed were 174.0 to 191.2 degrees C.

From these results, it can be noted that, by disposing the aluminum foil which is an example of the heat conducting member 123, the temperature in the region where the thermal switch 124 is disposed becomes substantially the same as the temperatures in the regions P1 to P2 and P4 to P10 where the thermal switch 124 is not disposed. On the other hand, it can be seen that, when the aluminum foil as an example of the heat conducting member 123 is not disposed, the temperature in the region where the thermal switch 124 is disposed was greatly reduced as compared with the temperatures in the regions P1 to P2 and P4 to P10 where the thermal switch 124 is not disposed. That is, it can be said that, by disposing the heat conducting member 123 between the outer peripheral surface of the raw material gas supply pipe 30 and the thermal switch 124, the thermal uniformity of the raw material gas supply pipe 30 can be improved even when the thermal switch 124 is disposed in the raw material gas supply pipe 30.

In the above-described embodiment, the raw material gas supply device 10 is an example of a raw material gas supply part. The exhaust pipe 80, the exhaust mechanism 82 and the pressure adjustment part 84 are an example of an exhaust part.

According to the present disclosure in some embodiments, it is possible to improve a thermal uniformity of a gas pipe.

It should be noted that the embodiments and modifications disclosed herein are exemplary in all respects and are not restrictive. The above-described embodiments may be omitted, replaced or modified in various forms without departing from the scope and spirit of the appended claims.

What is claimed is:
1. A pipe heating device, comprising:
 a sensor installed on a gas pipe;
 a heating part having at least one heat generation portion arranged so as to cover the gas pipe except for a region of the gas pipe where the sensor is installed; and
 a heat conductor attached between an outer peripheral surface of the gas pipe and the sensor and formed of a material having a higher thermal conductivity than the gas pipe,
 wherein the sensor is installed via the heat conductor in the region of the gas pipe where the at least one heat generation portion is not wound,
 wherein the at least one heat generation portion includes a plurality of heat generation portions, and
 wherein a length of the heat conductor in an axial direction of the gas pipe is set to be longer than a distance between two of the plurality of heat generation portions adjacent to each other.
2. The device of claim 1, wherein the heat conductor is a clamp configured to clamp the gas pipe.
3. The device of claim 2, wherein the gas pipe is a pipe through which a raw material gas obtained by vaporizing a solid or liquid raw material flows.
4. The device of claim 3, wherein the sensor is a thermal switch configured to cut off a supply of an electric power to the at least one heat generation portion at a predetermined temperature or greater.
5. The device of claim 4, wherein the heating part is a ribbon heater, and the at least one heat generation portion includes a resistance heating element.
6. The device of claim 5, wherein the gas pipe is made of a stainless steel, and the heat conductor is made of an aluminum.
7. The device of claim 1, wherein the gas pipe is a pipe through which a raw material gas obtained by vaporizing a solid or liquid raw material flows.
8. The device of claim 1, wherein the sensor is a thermal switch configured to cut off a supply of an electric power to the at least one heat generation portion at a predetermined temperature or greater.
9. The device of claim 1, wherein the heating part is a ribbon heater, and the at least one heat generation portion includes a resistance heating element.
10. The device of claim 1, wherein the gas pipe is made of a stainless steel, and the heat conductor is made of an aluminum.
11. A substrate processing apparatus, comprising:
 a processing container in which a substrate is processed;
 a raw material gas supply part having a raw material gas supply pipe and configured to supply a raw material gas into the processing container; and
 the pipe heating device of claim 1.
12. A substrate processing apparatus, comprising:
 a processing container in which a substrate is processed;
 a raw material gas supply part having a raw material gas supply pipe and configured to supply a raw material gas into the processing container;
 an exhaust part having an exhaust pipe and configured to exhaust a gas existing in the processing container;

an evacuation pipe having one end connected to the raw material gas supply pipe and the other end connected to the exhaust pipe; and a pipe heating device configured to heat at least one of the raw material gas supply pipe and the evacuation pipe, wherein the pipe heating device includes a sensor installed on the at least one of the raw material gas supply pipe and the evacuation pipe, a heating part having at least one heat generation portion arranged so as to cover the at least one of the raw material gas supply pipe and the evacuation pipe except for a region of the at least one of the raw material gas supply pipe and the evacuation pipe where the sensor is installed, and a heat conductor attached between an outer peripheral surface of the at least one of the raw material gas supply pipe and the evacuation pipe and the sensor and formed of a material having a higher thermal conductivity than the at least one of the raw material gas supply pipe and the evacuation pipe, wherein the sensor is installed via the heat conductor in the region of the at least one of the raw material gas supply pipe and the evacuation pipe where the at least one heat generation portion is not wound, wherein the at least one heat generation portion includes a plurality of heat generation portions, and wherein a length of the heat conductor in an axial direction of the at least one of the raw material gas supply pipe and the evacuation pipe is set to be longer than a distance between two of the plurality of heat generation portions adjacent to each other.

* * * * *